United States Patent [19]

Shields

[11] Patent Number: 4,999,924
[45] Date of Patent: Mar. 19, 1991

[54] PRECISION INDENTATION MEASUREMENT MARKING DEVICE

[76] Inventor: Roger V. Shields, 505 Rosina Dr., Los Osos, Calif. 93402

[21] Appl. No.: 468,694

[22] Filed: Jan. 22, 1990

[51] Int. Cl.⁵ .......................... G01B 3/10; B25H 7/04
[52] U.S. Cl. ...................................... 33/770; 33/768; 33/668
[58] Field of Search ................ 33/755, 757, 758, 759, 33/760, 761, 768, 769, 770, 668, 484, 485, 490, 491

[56] References Cited

U.S. PATENT DOCUMENTS

| | | | |
|---|---|---|---|
| 1,085,193 | 1/1914 | Buniff | 33/758 |
| 1,148,306 | 7/1915 | Fritz | 33/758 |
| 2,649,787 | 8/1953 | Kobayashi | 33/769 |
| 2,778,118 | 1/1957 | Manville | 33/770 |
| 2,807,886 | 10/1957 | Aciego | 33/189 |
| 3,063,157 | 12/1962 | Keene | 33/189 |
| 3,100,941 | 8/1963 | Taylor | 33/668 |
| 3,148,455 | 7/1964 | Aciego | 33/189 |
| 3,262,211 | 3/1966 | Beckett | 33/189 |
| 3,289,306 | 12/1966 | Todd | 33/760 |
| 3,336,678 | 8/1967 | Chamberlain et al. | 33/668 |
| 3,526,964 | 9/1970 | Clark, Jr. | 33/761 |
| 3,731,389 | 6/1973 | King | 33/189 |
| 3,802,083 | 4/1974 | Freed | 33/760 |
| 4,015,337 | 3/1977 | Taylor | 33/138 |
| 4,296,554 | 9/1981 | Hammerstrom | 33/138 |
| 4,439,927 | 8/1984 | Elliott | 33/189 |
| 4,542,589 | 11/1985 | Yamamoto | 33/138 |
| 4,630,376 | 12/1986 | Pentecost | 33/760 |
| 4,667,412 | 4/1987 | Carlson | 33/138 |
| 4,679,325 | 7/1987 | Sweatman | 33/668 |
| 4,729,171 | 2/1988 | Samson | 33/138 |

Primary Examiner—Thomas B. Will

[57] ABSTRACT

An improved tape measurement marking device attached to a measuring tape or built into a conventional tape housing. The device includes a sighting plane for alignment with the desired measurement mark on the tape; a structure for receiving and directing a hammer blow to a marking blade; and a marking blade that produces a dimensionless mark precisely at the desired measurement, a void to place the tape hook in, the void having an edge to hook the tape onto, the edge coinciding with the desired measurement mark; when the device is used on an existing tape, mechanisms for assembling, sliding, and clamping it on the tape are included.

5 Claims, 1 Drawing Sheet

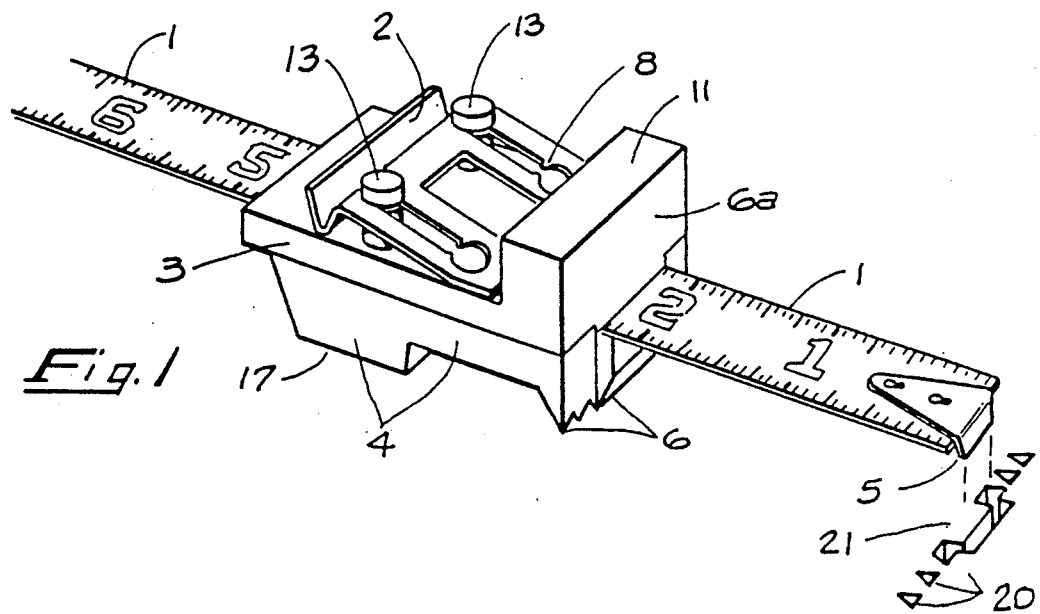
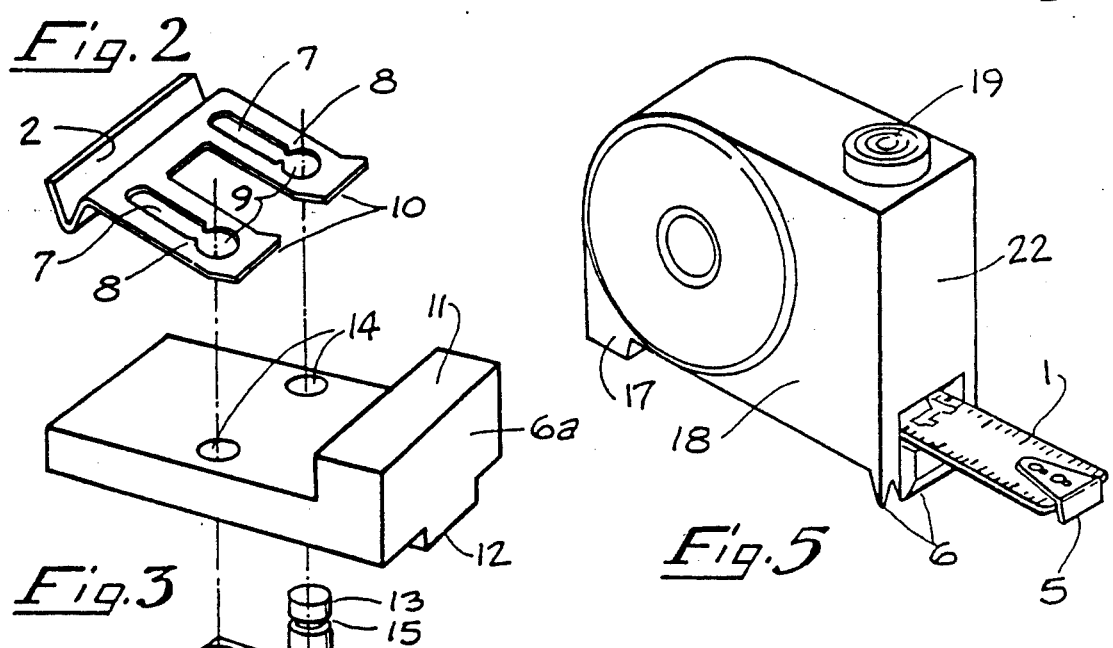
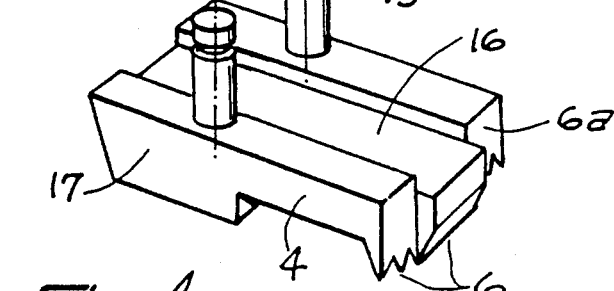

PRECISION INDENTATION MEASUREMENT MARKING DEVICE

FIELD OF INVENTION

This invention relates to tape measurements and marking these measurements on work pieces, particularly in construction trades and related occupations.

BACKGROUND OF INVENTION

Heretofore, layout of measurements in fields such as framing in carpentry use metal tapes coiled in housings and a lead pencil which has a lead that is ¼"×⅛" in cross section. The tape has a hook at the "0" mark, which is hooked over the end of the work piece to be measured, or placed at a prior pencil mark on the work piece. The tape is pulled out past the desired measurement, and the pencil is used to mark the measurement on the work piece. The inherent inaccuracies of this marking method produces errors that are costly to remedy.

These errors are due to:

1. the width of the pencil mark, often ¼" wide,
2. the limited ability of the eye to guide the free hand to mark precisely at the desired measurement,
3. the resulting pencil mark is often not parallel to the measurement marks on the tape,
4. the mark is often made in poor light or in a position that is awkward to align the pencil with the mark on the tape.

These inaccuracies cause expensive rework.

The patents examined relating to this marking problem have deficiencies in providing a solution to the problem, such as:

1. They are complex with many moving parts which subjects them to inaccuracies when the parts wear and they are costly to manufacture,
2. They are fragile and subject to damage,
3. They use pencils, chalk or ink pads which can produce a wide mark and require a convenient source of spare parts for replacement,
4. They use scribes or pointers which produce a scratch or a circular dot, neither capable of holding the tape hook on the measured mark for the starting point of the next measurement in a progressive series of measurements,
5. None of these patents have representative devices available in the marketplace,
6. They do not have a close proximity to my present invention.

SUMMARY OF THE INVENTION

A primary object of the present invention is to provide a marking device that has a simple structure, is easy to use, can be made from standard commercially available materials, and, due to simplicity of design thereof, may be retailed at a low price to encourage widespread use.

A further objective of the invention is to supply a marking device to attach to measuring tapes that provides dimensional marks rapidly and with great accuracy even in awkward positions or with very little light. According to a further feature, the measurement mark produced by my invention is dimensionless, is parallel to and coincides with the desired marker on the tape, and further produces a void to place the tape hook into to allow the tape hook to engage the marked line for the next measurement.

In another embodiment, my invention is incorporated into the design and manufacture of the housing of a conventional measuring tape, thereby providing the same improvements and performance listed in the preceding paragraph. Since most conventional tapes have built-in clamping devices, only the addition of a structure able to absorb and direct the force of a hammer blow to the indentation blade, the sighting means and the blade is needed.

Other objects, features and advantages of my invention will be apparent to those skilled in the art from the following detailed description taken in conjunction with the accompanying drawing of the two embodiments exemplifying the principles of my invention.

BRIEF DESCRIPTION OF THE DRAWINGS

FIG. 1 is a perspective drawing illustrating a preferred embodiment of the present invention assembled on an existing extensible measuring tape;

FIG. 2 is a perspective drawing of the clamping and locking spring;

FIG. 3 is a perspective drawing of the upper body of the marking device comprising elements of the clamping, impact structure, and alignment sighting functions;

FIG. 4 is a perspective drawing of the base of the marking device comprising the indentation blade, and elements of aligning, clamping, and impact structure functions;

FIG. 5 is a perspective drawing of the marking device integrated into the housing of a conventional extensible measuring tape;

FIG. 6 is a plan view of one configuration of the mark produced by the indentation blade on the measured work piece. The dark areas indicate the voids in the work piece. Obviously the mark can be produced in many shapes. One other preferred shape would be a narrow rectangle shaped groove with one long side coinciding with the desired measurement mark.

DRAWING REFERENCE NUMERALS

1. Measuring tape
2. Clamping and locking springs
3. Upper body
4. Base
5. Tape hook
6. Indentation marking blade
6.a. Sighting and indexing face for aligning one surface of blade 6 with desired measurement mark.
7. Slots in 2
8. Protrusions on sides of 7
9. Enlargements of slots 7 that fit into pins 3.
10. Angled arms of spring 2.
11. Impact structure of body 3.
12. Protrusion that fits in alignment and clamping slot 16.
13. Alignment and clamping pins that hold faces of 6a and blade 6 in same plane.
14. Holes in body 3 that fit on pins 13 and allow body 3 to be aligned with and assembled on base 4.
15. Flutes in pins 13 that receive slots producing clamping force as spring 2 is pushed toward impact structure 11.
16. Slot receiving tape 1 and holding tape markings parallel to sighting face 6a and blade 6.
17. Heel holds the face of index plane 6a perpendicular to measured work piece surface.
18. Housing of conventional measuring tape that this measurement marking device is incorporated into.

19. Impact target and pad.
20. Plan view of indentation measurement mark made by blade 6 after impact on impact structure 11 or 19, with the indentation or groove shown as the dark area; the dark triangles indicate the mark to cut measured work piece to, or to center or align a joining work piece to, such as a wall stud or an end frame. Line or edge 20 coincides with the desired measurement and is generated by intersection of the work piece surface and the wall of indentation or groove.
21. Plan view of measured work piece showing dark area as the indentation grooves left by indentation blade 6 after impact on impact structure 11 or 19 used for inserting tape hook 5 for continuous lay-out measurements to position adjoining wall studs. Line or edge 21 coincides with the desired measurement mark and is generated by the intersection of the work piece surface and the wall of the indentation. The tape hook 5 is inserted in the indentation to the right of the edge, tape 1 is pulled to the left with the tension holding it in place, thereby allowing 11 or 19 to be struck, thereby producing the indentation mark for the position of the next adjoining stud.
22. Sighting and indexing face on conventional tape housing, surface 22 serves same function as face 6a.

A typical embodiment of my invention is shown assembled on measuring tape 1 in FIG. 2. The individual parts composing the device are the spring clamp 2 in FIG. 2, the upper body 3 in FIG. 3, and the base 4 in FIG. 4.

In operation, tape 1 is placed in slot 16 in base 4 with tape hook towards the blade 6 side, upper body 3 is placed with holes 14 over pins 13 and pressed down onto base 4, spring 2 is placed with enlargements 9 over pins 13 and pressed down and toward impact structure 11 with slots 7 engaging flutes 15 on pins 13 so that protrusions 8 force arms 10 out until protrusions 8 are past pins 13 toward structure 11.

The device is now assembled on tape 1 as shown in FIG. 1 and can be moved to any desired position on tape 1. To set and clamp the device to a desired measurement mark, sight down face 6a to the mark and slide clamp 2 toward structure 11 as far as it will go and protrusion 12 will lock tape 1 in slot 16. To mark desired measurement on work piece, place tape hook 5 on end of work piece or for successive measurements in groove made in work piece by blade 6 in former operation, pull tape 1 tense on work piece, and with heel 17 holding blade 6 perpendicular to the surface of the work pieces, strike impact structure 11 or pad 19 in FIG. 5, blade 6 will be forced into work piece producing a deep groove FIG. 6. The left wall as the device is shown, coinciding with the vertical plane passing through the desired measurement mark thereby producing a dimensionless, accurate mark or edge, 20 and 21, formed by the intersection of the work piece surface and the wall of the groove. This mark is used for cutting the work piece to size, aligning or adjoining a second work piece, placing tape hook 5 against the left wall 20 for the "0" or starting position of the next measurement, or any other use of this precision position mark.

An alternate embodiment of my invention incorporates the device into a conventional tape housing 18 shown in FIG. 5. In use, face 22 is sighted to the desired mark on the tape 1, the clamp, in the conventional tape housing 18, is engaged, the tape hook 5 is placed at the end of the work piece or on the wall of the indentation or groove produced by blade 6, and with the tape 1 held on the work piece surface, and with heel 17 holding blade 6 perpendicular to the surface of the work piece, impact structure 19 is struck forcing blade 6 to produce a groove with the left wall precisely in the face 22 coinciding with the desired measurement mark.

Thus the reader will see that the marker of my invention is economical to produce, simple and easy to use effectively with a minimum of moving parts, will produce very accurate marks under poor operating conditions, will save time in making layouts, and probably the most unique and beneficial improvement is the resulting dimensionless mark with a groove to receive the tape hook and provisions to hold the hook on the precise mark to start the next measurement.

It is apparent that various modifications of the components of my invention can be made, and it is understood that my invention should not be restricted to the configuration, construction and arrangement of parts herein illustrated and described, but should include all such modified forms thereof which fall within the spirit and scope of my invention and the following claims.

I claim:

1. A precision marking device, for use with an extensible measuring tape having a tape hook secured at a free end and measurement marks parallel to said hook comprising:
    (a) a means for sliding said marking device along said tape to a desired measurement on said tape;
    (b) an indentation blade attached to said means for sliding;
    (c) a means for sighting attached to said means for sliding for sighting said desired measurement and aligning said indentation blade with said desired measurement on said tape;
    (d) a means for locking attached to said means for sliding for locking said marking device on said tape at said desired measurement on said tape;
    (e) a structure comprising an impact target on said structure connecting said target to said blade, said structure capable of absorbing and directing the force of a blow to said blade;
    (f) said indentation blade configured so that when said indentation blade is locked at said desired measurement on said tape and absorbs said blow said blade produces a groove in a surface of a work piece being measured, a wall of said groove being formed perpendicular to the surface of said work piece, said wall and said surface forming an edge coinciding with said desired measurement on said tape, said groove being capable of allowing said tape hook to be inserted and hooked onto said edge, thereby providing a precise starting location and holding means for said tape hook, by applying tension in said tape, for the next measurement.

2. The marking device of claim 1, wherein said means for sliding, includes a base comprising a means for attaching said blade to said base and holding said blade perpendicular to said work piece surface with the free end of said blade contacting said work piece surface, said base further including a heel to hold said blade perpendicular to said work piece surface, said base further including a slot composed of a bottom and two sides perpendicular to said bottom, said slot provided to receive and hold said tape measurement marks parallel to said blade, said base further including two alignment pins mounted on the upper surface of said base and perpendicular to said upper surface, said pins providing an essential component of said means of aligning said blade with said desired measurement on said tape; said marking device further including an upper body with two holes for receiving said alignment pins of said base, said holes being slightly larger in diameter than said pins, said pins being inserted into said holes and protruding above the upper surface of said upper body, thereby holding said base and said upper body in alignment, said upper body further including said sighting means comprising a sighting face in the plane perpendicular to said tape and parallel to said measurement marks and also parallel to the plane passing through the axis of said holes thereby, in conjunction with said alignment pins, said heel, and said base, providing said sighting and aligning means; said upper body further including a protrusion on said upper body's lower surface, said protrusion provides the upper surface of said slot thereby completing said sliding means, said protrusion also provides a clamping surface, on said tape, in conjunction with said bottom of said base, thereby providing an essential component of said locking means; said marking device further including a spring with two parallel arms having slots that fit into flutes cut into the tops of said alignment pins in said base, said slots having openings large enough to allow said pins to fit into said openings, said openings placed on said arms at their free ends, said slots including protrusions that snap over said pins when said spring is forced toward said sighting plane in said upper body, thereby holding said base, said upper body, and said spring in an assembly on said tape; said spring arms bent in a manner to produce a downward pressure on said upper body when said spring is moved toward said sighting plane, said pressure thereby locking said tape between said protrusion of said upper body and said bottom of said slot in said base, thereby providing said locking means.

3. The marking device of claim 2, wherein said impact target is located on said upper body and is higher than said alignment pins and said spring to prevent impact and damage to said pins and said spring from said blow, said structure capable of receiving said blow and conveying said force of said blow to said base, said base capable of directing said force to said blade, thereby producing said groove in said work piece.

4. A precision marking device, built into and manufactured integrally with a housing of a conventional extensible measuring tape housing a tape hook secured at a free end and measurement marks parallel to said hook, and a built in tape locking mechanism for locking said housing at a desired measurement on said tape, said housing having an upper horizontal surface, comprising:

(a) an indentation blade attached to said housing;
(b) a means for sighting said desired measurement and aligning said indentation blade with said desired measurement on said tape;
(c) a structure comprising an impact target on the upper horizontal surface of said housing, said target supported by the vertical walls of said housing, said walls capable of absorbing and directing the force of a blow to said blade;
(d) said indentation blade configured so that when said indentation blade is locked at said desired measurement on said tape and absorbs said blow said blade produces a groove in a surface of a work piece being measured, a wall of said groove being formed perpendicular to the surface of said work piece, said wall and said surface forming an edge coinciding with said desired measurement on said tape, said groove being capable of allowing said tape hook to be inserted and hooked onto said edge, thereby providing a precise starting location and holding means for said tape hook, by applying tension in said tape, for the next measurement.

5. The marking device of claim 4, wherein said housing further includes six rectangular sides with the bottom side containing said blade and a heel to hold said blade perpendicular to said surface of said work piece, said blade also held parallel to and in the same plane as said desired measurement, said bottom side being parallel to and above said surface; the top side of said housing having said upper horizontal surface being parallel to said bottom side, said impact target being located on said top side above said blade; one of the vertical sides of said housing being perpendicular to said bottom side and said top side, parallel to and in the same plane as said measurement marks on said tape, said one of the vertical sides having an aperture where it intersects said bottom side, said aperture allowing said tape to be extended, said one of the vertical sides used as a sighting face and for positioning said device at said desired measurement, the intersection of said vertical side and said desired measurement being held directly and vertically over said indentation blade, thereby providing said sighting and aligning means.

* * * * *